(No Model.)
C. H. TRUAX.
OPERA GLASS ATTACHMENT.
No. 459,242. Patented Sept. 8, 1891.
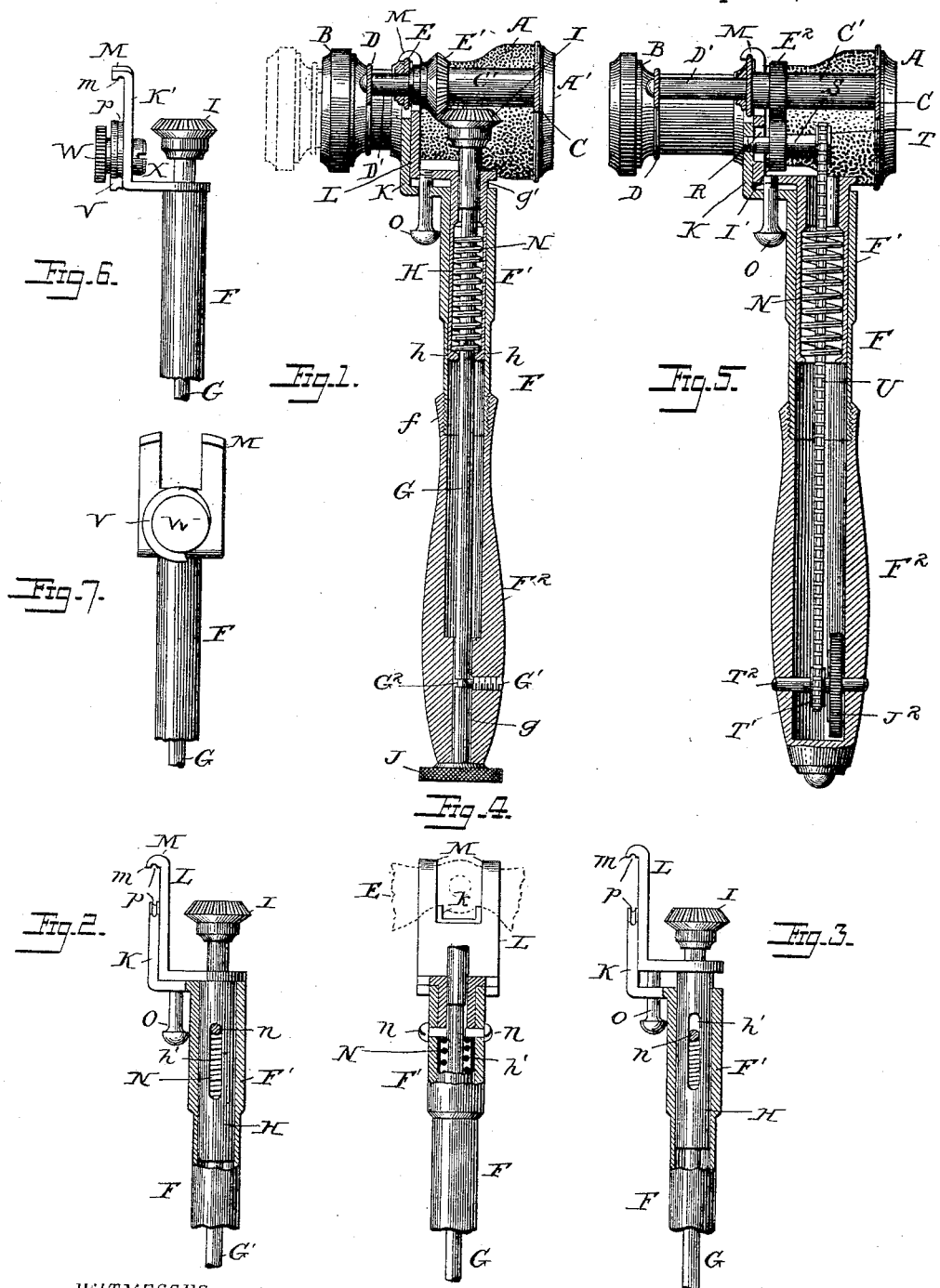
WITNESSES
INVENTOR
Chas. H. Truax
by Foster Freeman
Attorneys

UNITED STATES PATENT OFFICE.

CHARLES H. TRUAX, OF CHICAGO, ILLINOIS.

OPERA-GLASS ATTACHMENT.

SPECIFICATION forming part of Letters Patent No. 459,242, dated September 8, 1891.

Application filed November 24, 1890. Serial No. 372,501. (No model.)

*To all whom it may concern:*

Be it known that I, CHARLES H. TRUAX, a citizen of the United States, residing at Chicago, Cook county, State of Illinois, have invented certain new and useful Improvements in Opera-Glass Attachments, of which the following is a specification.

My invention relates to opera, field, and similar glasses in which the lenses are mounted in tubes which are adjustable with relation to each other in order to focus the object at which the instrument is directed, and it has for its object to provide means whereby said glasses may be easily and readily supported in position for use and adjusted to produce the proper focus of the various objects; and to these ends my invention consists in a glass having a supporting-handle, which handle is provided with means constructed, arranged, and operating substantially as more particularly hereinafter pointed out for adjusting the glass.

In the accompanying drawings I have shown my invention applied to an ordinary binocular opera-glass, and in Figure 1 is shown a vertical cross-section of the handle and glass together; Figs. 2 and 3, vertical sections of a portion showing the preferred means of connecting the handle and glass. Fig. 4 is a front view, partially in section, of the same. Fig. 5 is a vertical cross-section showing a modified connection, and Figs. 6 and 7 are front and side views of a modified connection.

The glass, as shown, consists of an exterior casing A, supporting one of the lenses A', into which slides telescopically a tube or case B, carrying the usual lens. (Not specifically shown.) These tubes or cases are arranged in pairs, as is usual, and are united by the cross-pieces C, D, and E, and to the cross-piece D is connected a screw-pin D', which slides in the tube C', which is screw-threaded or otherwise adapted to expel or draw in the pin D' in the usual way by turning the wheel or thumb-piece E' so that the two tubes will move telescopically with relation to each other, as is common in this class of instruments.

The handle F may be made of any suitable or desirable material, and is shown as consisting of two sections F' F², united together at $f$ and forming a hollow tube through which passes the shaft or rod G, the lower end fitting in bearings $g$, and having suitable means for confining it in position therein and at the same time allowing it to freely rotate—as, for instance, the screw G', the end of which projects into groove G² in the shaft, while the upper end fits in bearings $g'$ in a sliding portion H, which in turn is mounted in the hollow handle F. This shaft is provided on its upper ends with means whereby it can be connected with appliances for adjusting the eye-lenses—as, for instance, to the wheel or thumb-piece E' on the glass—so as to rotate the same, and thereby move the tubes of the glass telescopically to adjust them; and I have shown in the present instance, a beveled gear-wheel I, which meshes with the bevel face of the wheel E', and the shaft is provided at its other end with means for rotating it, as the milled wheel J. It will thus be seen that when the handle is properly connected to the frame of the glass the shaft can be rotated in either direction, and thereby, through the medium of the double gears, the glasses can be adjusted to suit the eyes of the person using them, and this without the necessity of raising the hand to the glasses.

In Fig. 5 I have illustrated a modified form in which the usual milled wheel E² found on all opera-glasses and the like is utilized to adjust the focus. In this case the arm K supports a shaft R, upon which is mounted a wheel I', preferably having an elastic surface, as of rubber, so that it will, when brought in contact with the milled wheel E², operate the same by friction. This wheel is preferably mounted on a sleeve S upon the shaft R, and is provided with a sprocket-wheel T, over which passes a chain U, extending down through the handle and passing over a similar sprocket-wheel T', mounted in the lower portion of the handle on a suitable shaft T². Also mounted on this shaft is the milled wheel J², which extends through slots in the handle, so as to be readily operated. With this construction no change need be made with the ordinary opera-glass of commerce, but the handle, with its operating mechanism, may be attached to the glasses in the manner before stated.

In order to connect the handle and glasses, I provide a simple clutch device which can be readily operated so as to attach and detach the handle and glasses, and I have shown the upper portion of the handle F' as being provided with an offset or arm K, the upper portion of which is preferably notched, as shown at $k$.

Mounted to slide in the interior of the handle is the tubular portion H, provided with a similar offset or arm L, and this arm is bifurcated or slotted at its upper end to form the fingers M M, the ends of which are turned at right angles to form the hooks $m$. This tube slides in the handle freely, but is normally under stress of a spring N or equivalent device, which tends to hold it in the handle, but which permits it to be pushed outwardly, so that the hooks $m$ can be separated from the projections $k$ of the arm K for the purpose of receiving the cross-piece E or other portion of the glass-frame. In order to operate this slide, I preferably provide a push-pin O, which moves freely through a hole in the arm K and is connected to the arm L.

The retracting-spring N, while it may be of any suitable and desirable shape, is shown as a spiral spring bearing upon inwardly-projecting lugs $h$ on a tube H and surrounding the shaft G, the other end of the spring being limited by the screws $n$ passing through the case F' and through slots $h'$ in the sliding tube H.

In order that the jaws of the clamp may accurately grasp the frame of the glass and hold it in a steady position, I preferably groove the fingers and the co-operating end of the supporting-arm, as shown at $p$, and in this way the glass-frame is securely grasped and held in a rigid position with relation to the handle.

The operation of the device is apparent from the above description, and it will be seen that the handle may be readily detached from the glass-frame by simply pressing the button O, forcing the fingers M away from the opposite jaws, and the frame is removed from the bite of the jaws, and the glasses may be carried in their usual case or otherwise and used in their ordinary manner. When, however, it is desired to connect the handle and glasses, the jaws are again separated as before and the frame placed in position between the notches in the jaw and the bevel-gear I brought into mesh with the gear E', or the elastic friction-wheel I' brought to bear upon the milled wheel $E^2$ and the pressure removed from the pin O, when it will be found that the glasses are securely attached to the handle and may be supported thereby by the user, and at the same time the lenses may be adjusted by operating the milled screw J to produce the proper focus of the objects.

In Figs. 6 and 7 I have illustrated a different means whereby the handle, with its propelling-shaft, may be connected to the glasses. The handle F, which may be in one piece, carries the shaft G, having the bevel-wheel or other propelling device I on its upper end adapted to engage with the glasses to move them telescopically. The offset or arm K' in this instance is rigidly connected to the case F and has the beveled arms M provided with the groove $m$. Secured to this offset is a cam V, connected by a thumb-screw W, which is secured to the offset by a set-screw X. The periphery of this cam is preferably grooved at $p$, so as to more perfectly grasp the frame of the glasses. It will be seen that when the frame is placed between the bent arms M and the cam the latter can be rotated by means of the thumb-screw W to securely clamp the frame in position and hold the handle and glasses together, while the beveled wheel or other means can be rotated as before to adjust the focus of the glasses.

While I have thus described specifically the preferred embodiments of my invention, it is apparent that the details of construction and arrangements of parts may be varied by those skilled in the art to suit the exigencies of any particular case without departing from the principles of my invention.

What I claim is—

1. The combination, with an opera-glass having adjustable lenses and means for adjusting the focus thereof, of a separate handle having jaws adapted to engage the glass and provided with adjusting devices adapted to engage the adjusting devices on the glass to regulate the focus of the lenses, substantially as described.

2. The combination, with an opera-glass having a propelling-wheel to adjust the focus of the lenses of the glass, of a handle provided with a wheel arranged to engage the propelling-wheel of the glass, the said wheel being connected to be operated from the lower end of the handle, substantially as described.

3. The combination, with the glass, of a detachable handle provided with spring-actuated gripping-jaws, a shaft passing through the handle, and connections between the handle and glass, whereby the lenses may be adjusted with relation to each other, substantially as described.

4. The combination, with the frame of the glass, of a handle provided with a stationary jaw and a movable spring-actuated jaw, the jaws being provided with grooves, substantially as described.

5. The combination, with the opera-glass, of a detachable handle provided with a longitudinal shaft and beveled gears mounted on the glass and handle, whereby the glass may be operated, substantially as set forth.

6. The combination, with the frame of the opera-glass, of a detachable handle provided with spring-actuated gripping-jaws and a longitudinal shaft in the handle provided with a milled head at one end and a beveled pinion at the other end, whereby the handle may be attached to the glass-frame and operate the glasses to adjust the focus, substantially as described.

In testimony whereof I have signed my name to this specification in the presence of two subscribing witnesses.

CHARLES H. TRUAX.

Witnesses:
W. S. McARTHUR,
J. J. McCARTHY.